United States Patent
Sun et al.

(10) Patent No.: US 7,645,307 B2
(45) Date of Patent: *Jan. 12, 2010

(54) COMBINATIONAL CONTROL STRATEGY FOR FUEL PROCESSOR REACTOR SHIFT TEMPERATURE CONTROL

(75) Inventors: Hongqiao Sun, Sugar Land, TX (US);
Daniel G. Casey, Kingwood, TX (US);
Vesna R. Mirkovic, Pearland, TX (US);
Bhaskar Balasubramanian, Houston, TX (US); W. Spencer Wheat, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 577 days.

This patent is subject to a terminal disclaimer.

(21) Appl. No.: 11/015,992

(22) Filed: Dec. 17, 2004

(65) Prior Publication Data

US 2006/0133971 A1 Jun. 22, 2006

(51) Int. Cl.
*B01J 8/00* (2006.01)
*G06F 19/00* (2006.01)
*G05D 7/00* (2006.01)

(52) U.S. Cl. .................... 48/127.7; 48/127.3; 48/127.9; 422/105; 422/108; 422/110; 422/112; 700/266; 700/274

(58) Field of Classification Search ................. 48/127.7, 48/127.9, 127.3; 422/105, 108, 110, 112; 700/266, 274
See application file for complete search history.

(56) References Cited

U.S. PATENT DOCUMENTS

| | | | |
|---|---|---|---|
| 6,455,008 B1 * | 9/2002 | Aoyama et al. | 422/108 |
| 6,796,332 B1 | 9/2004 | Nguyen | |
| 6,824,577 B2 | 11/2004 | Deshpande | |
| 6,993,403 B1 * | 1/2006 | Dadebo et al. | 700/108 |
| 7,035,050 B1 * | 4/2006 | Kulangara | 360/245.9 |
| 7,184,847 B2 * | 2/2007 | Sun et al. | 700/42 |
| 2002/0094310 A1 | 7/2002 | Krause et al. | |

FOREIGN PATENT DOCUMENTS

JP  2001035517  *  2/2001

* cited by examiner

*Primary Examiner*—N. Bhat
(74) *Attorney, Agent, or Firm*—Melissa Patangia; Frank C. Turner; Williams Morgan & Amerson

(57) ABSTRACT

A method and apparatus for use in controlling the reaction temperature of a fuel processor are disclosed. The apparatus includes a fuel processor reactor, the reactor including a water gas shift reaction section; a temperature sensor disposed within the reaction section; a coolant flow line through the reaction section; and an automated control system. The automated control system controls the reaction temperature by determining a first component for a setting adjustment for the actuator from the measured temperature and a setpoint for the measured temperature; determining a second component for the setting adjustment from a hydrogen production rate for the fuel processor; and determining the setting adjustment from the first and second components.

17 Claims, 6 Drawing Sheets

COMBINATIONAL CONTROL STRATEGY FOR FUEL PROCESSOR REACTOR SHIFT TEMPERATURE CONTROL

BACKGROUND OF THE INVENTION

1. Field of the Invention

The present invention is directed to a fuel processor, and, more particularly, to a control system for use in a fuel processor.

2. Description of the Related Art

There are numerous uses for pure hydrogen or hydrogen-enriched gas streams. For instance, fuel cells—a promising alternative energy source—typically employ hydrogen as a fuel for generating power. Many industrial processes also employ hydrogen or hydrogen-enriched gas streams in a variety of fields for the manufacture and production of a wide assortment of end products. However, pure hydrogen is not available as a natural resource in a form that can be readily exploited. As an example, natural gas, a hydrocarbon-based fuel, is frequently found in large subterranean deposits that can be easily accessed and transported once tapped. Nature does not provide such deposits of hydrogen.

One way to overcome this difficulty is the use of "fuel processors" or "reformers" to convert hydrocarbon-based fuels to a hydrogen rich gas stream which can be used as a feed for fuel cells. Hydrocarbon-based fuels, such as natural gas, liquid petroleum gas ("LPG"), gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

More particularly, the ATR performs a water-gas shift reaction that reduces CO concentration and increases $H_2$ production rate. This reaction is exothermal and sensitive to the temperature. Shift reaction temperature control is therefore a significant element for continuously making stable, low CO concentration and high $H_2$ yield reformate. And, better temperature control provides a more consistent, higher quality end product.

SUMMARY OF THE INVENTION

The invention is a method and apparatus for use in controlling the reaction temperature of a fuel processor. The apparatus comprises a fuel processor reactor, the reactor including a water gas shift reaction section; a temperature sensor disposed within the reaction section; a coolant flow line through the reaction section; and an automated control system. The automated control system controls the reaction temperature by determining a first component for a setting adjustment for the actuator from the measured temperature and a setpoint for the measured temperature; determining a second component for the setting adjustment from a hydrogen production rate for the fuel processor; and determining the setting adjustment from the first and second components.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is generally directed to method and apparatus for controlling the reaction temperature of a "fuel processor," or "reformer," i.e., an apparatus for converting hydrocarbon fuel into a hydrogen rich gas. The term "fuel processor" shall be used herein. In the embodiment illustrated herein, the method and apparatus control a compact processor for producing a hydrogen rich gas stream from a hydrocarbon fuel. However, other fuel processors may be used in alternative embodiments. Furthermore, many possible uses are contemplated for the apparatus and method described herein, including any use wherein a hydrogen rich stream is desired. For instance, synthesis gas streams derived from gasification or otherwise that comprise hydrogen and CO are commonly subjected to water gas shift reactions to convert CO to hydrogen and $CO_2$. The method and apparatus may also be used in embodiments not applicable to the production of gas streams.

Figure 1:
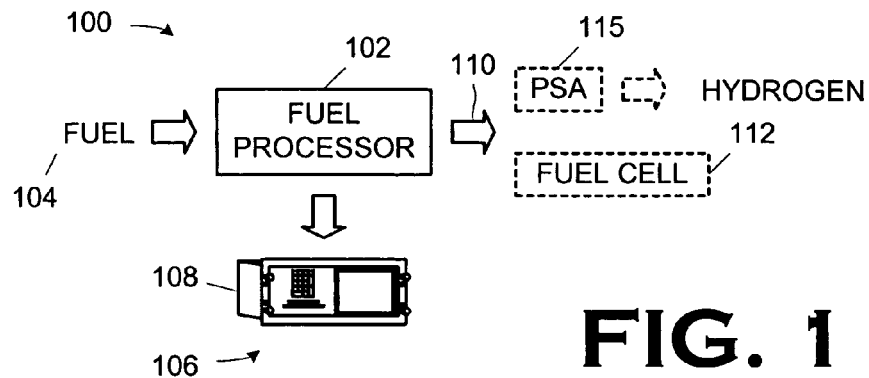
FIG. 1 presents one particular embodiment of an apparatus assembled and operated in accordance with the present invention.

FIG. 1 illustrates an apparatus 100 including a fuel processor 102 fed a fuel 104 and operating under an automated control system 106, represented by a computing apparatus 108. The fuel processor 102 reforms the fuel 104 to produce a reformate 110. The automated control system 106 controls the process by which the fuel processor 102 reforms the fuel 104 into the reformate 110. The design of the fuel processor 102, and the reforming process, will depend to a large degree on the fuel 104 input to the fuel processor 102 and the end use to which the reformate 110 will be put.

The fuel processor 102 may be a self-contained auto-thermal reforming ("ATR") fuel processor that converts pipeline-quality natural gas to fuel cell grade fuel, although the invention may be practiced with alternative fuels and end applications. For instance, the reformate 110 may be output to a pressure swing adsorber ("PSA") unit 115 for the production of a purified hydrogen, or a hydrogen enriched gas stream 112. Means other than a PSA may be utilized for purifying or concentrating hydrogen. The purified hydrogen 112 can then be stored and/or distributed to an end application such as powering a fuel cell 112, such as a conventional Proton Exchange Membrane Fuel Cell ("PEMFC"), also known as a Polymer Electrolyte Fuel Cell ("PEFC"), for example.

As previously mentioned, the fuel in the illustrated embodiment is natural gas, but may be some other type of hydrocarbon. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like.

The fuel processor 102 provides a hydrogen-rich effluent stream, or "reformate," as indicated by the graphic 110, to the fuel cell 112 or the PSA unit 115, for example. The reformate 110, in the illustrated embodiment, includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream). Note, however, that the precise composition of the reformate 110 is implementation specific and not material to the practice of the invention.

Figure 2:
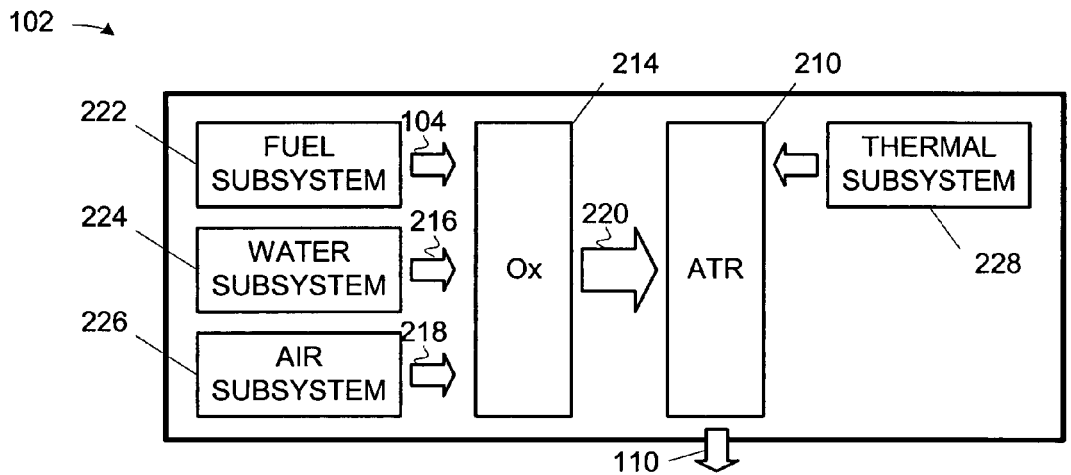
FIG. 2 illustrates one particular embodiment of the fuel processor of the apparatus in FIG. 1.

FIG. 2 illustrates one particular embodiment of the fuel processor 102 of the illustrated embodiment. The fuel processor 102 comprises several modular physical subsystems, namely:

an autothermal reformer ("ATR") 210 that performs a partial oxidation and a steam reforming reaction to reform the fuel 104 into the reformate 110;

an oxidizer ("Ox") 214, which is an anode tailgas oxidizer ("ATO") in the illustrated embodiment, that preheats water 216, fuel 104, and air 218 for delivering a heated fuel mixture, or "process feed stream", 220 to the ATR 210;

a fuel subsystem 222, that delivers an input fuel 104 to the oxidizer 214 for preheating and inclusion in the process feed stream 220 delivered to the ATR 210;

a water subsystem 224, that delivers the water 216 to the oxidizer 214 for conversion to steam and inclusion in the process feed stream 220 delivered to the ATR 210;

an air subsystem 226, that delivers air 218 to the oxidizer 214 for mixing into the process feed stream 220 delivered to the ATR 210; and a thermal subsystem 228, that controls temperatures in the operation of the ATR 210 by circulating a coolant 216 therethrough.

One particular embodiment of the ATR 210 is disclosed more fully below. The fuel subsystem 222, water subsystem 224, air subsystem 225, and thermal subsystem 228 may be implemented in any manner known to the art suitable for achieving the operational characteristics of the oxidizer 214 and ATR 210.

Figure 3:
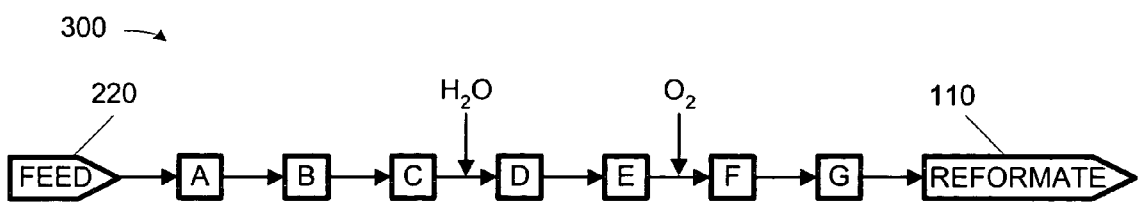
FIG. 3 depicts a general process flow diagram illustrating the process steps included in the illustrative embodiments of the present invention.

FIG. 3 is a general process flow diagram illustrating the process steps 300 included in the illustrative embodiments of the present invention as performed by the ATR 210 to produce the reformate 110, first shown in FIG. 1. The following description associated with FIG. 3 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1).

The fuel processor 102 process feed stream 220 includes a hydrocarbon fuel, oxygen, and water mixture, as was described above. The oxygen can be in the form of air, enriched air, or substantially pure oxygen. The water can be introduced as a liquid or vapor. The composition percentages of the feed components are determined by the desired operating conditions, as discussed below. The fuel processor effluent stream (not shown) of the present invention includes hydrogen and carbon dioxide and can also include some water, unconverted hydrocarbons, carbon monoxide, impurities (e.g., hydrogen sulfide and ammonia) and inert components (e.g., nitrogen and argon, especially if air was a component of the feed stream).

Process step A is an autothermal reforming process in which, in one particular embodiment, two reactions, a partial oxidation (formula I, below) and an optional steam reforming (formula II, below), are performed to convert the feed stream 220 into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

The process feed stream 220 is received by the processor reactor from the oxidizer 214, shown in FIG. 2. A higher concentration of oxygen in the process feed stream 220 favors partial oxidation whereas a higher concentration of water vapor favors steam reforming. The ratios of oxygen to hydrocarbon and water to hydrocarbon are therefore characterizing parameters that affect the operating temperature and hydrogen yield.

The operating temperature of the autothermal reforming step A can range from about 550° C. to about 900° C., depending on the feed conditions and the catalyst. The ratios, temperatures, and feed conditions are all examples of parameters that can be controlled by the control system of the present invention. The illustrated embodiment uses a partial oxidation catalyst and a steam reforming catalyst in reforming process step A.

Process step B is a cooling step for cooling the synthesis gas stream from process step A to a temperature of from about 200° C. to about 600° C., preferably from about 375° C. to about 425° C., to prepare the temperature of the synthesis gas effluent for the process step C (discussed below). This cooling may be achieved with heat sinks, heat pipes or heat exchangers depending upon the design specifications and the need to recover/recycle the heat content of the gas stream using any suitable type of coolant. For instance, the coolant for process step B may be the coolant 216 of the thermal subsystem 228.

Process step C is a purifying step and employs zinc oxide (ZnO) as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulfurization is accomplished by converting the hydrogen sulfide to zinc sulfide in accordance with the following reaction formula III:

$$H_2S + ZnO \rightarrow H_2O + ZnS \tag{III}$$

The reaction is preferably carried out at a temperature of from about 300° C. to about 500° C., and more preferably from about 375° C. to about 425° C.

Still referring to FIG. 3, the effluent stream may then be sent to a mixing step D in which water 216 received from the water subsystem 224, both shown in FIG. 2, is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water. Alternatively, any additional water can be introduced with the feed 220, and the mixing step can be repositioned to provide better mixing of the oxidant gas in the CO oxidation step G (discussed below). This temperature can also controlled by the control system of the present invention.

Process step E is a water gas shift reaction that converts carbon monoxide to carbon dioxide in accordance with formula IV:

$$H_2O + CO \rightarrow H_2 + CO_2 \tag{IV}$$

The concentration of carbon monoxide in the final reformate should preferably be lowered to a level that can be tolerated by fuel cells, typically below 50 ppm. Generally, the water gas shift reaction can take place at temperatures of from 150° C. to 600° C. depending on the catalyst used. Under such conditions, much of the carbon monoxide in the gas stream is converted. This temperature and concentration are more parameters that are controlled by the control system of the present invention.

Referring still to FIG. 3, process step F is a cooling step. Process step F reduces the temperature of the gas stream to produce an effluent having a temperature preferably in the range of from about 90° C. to about 150° C. Oxygen from an air subsystem (not shown) is also added to the process in step F. The oxygen is consumed by the reactions of process step G described below.

Process step G is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \tag{V}$$

$$H_2 + \tfrac{1}{2}O_2 \rightarrow H_2O \tag{VI}$$

The preferential oxidation of carbon monoxide is favored by low temperatures. Since both reactions produce heat it may be advantageous to optionally include a cooling element such as a cooling coil, disposed within the process. The operating temperature of processs step G is preferably kept in the range of from about 90° C. to about 150° C. Process step G reduces the carbon monoxide level to preferably less than 50 ppm, which is a suitable level for use in fuel cells. Where a purification unit such as a pressure swing adsorption unit is disposed downstream of fuel processor 102 for removing CO and other impurities, the preferential oxidation reaction of step G can be omitted.

The reformate 110 exiting the fuel processor 102 is a hydrogen rich gas containing carbon dioxide and other constituents which may be present such as water, inert components (e.g., nitrogen, argon), residual hydrocarbon, etc. Product gas may be used as the feed 220 for a fuel cell or for other applications where a hydrogen rich feed stream is desired. Optionally, product gas may be sent on to further processing, for example, to remove the carbon dioxide, water or other components.

In some embodiments, the water gas shift of the ATR 210 employs non-pyrophoric shift catalyst(s), not shown. Non-pyrophoric shift catalysts are those that typically do not increase in temperature more than 200° C. when exposed to air after initial reduction. Non-pyrophoric shift catalysts may be based on precious metals, e.g., platinum or non-precious metals, e.g., copper. A commercially available non-pyrophoric shift catalyst suitable for use with the present invention is the SELECTRA SHIFT™ available from:

Engelhard Corporation 101 Wood Avenue Iselin, N.J. 08830 (732) 205-5000

However, other suitable non-pyrophoric shift catalysts may be used.

During reforming operations of ATR 210, reformate and optionally additional steam are directed through the shift catalyst bed. Care should be taken to assure that liquid water does enter the shift bed as liquid water will coat and potentially degrade the catalyst. The shift reaction temperature is maintained at a temperature below about 300° C. The shift catalyst can withstand transient temperatures that exceed such temperatures for short periods of time of less than about 60 minutes, preferably less than about 45 minutes, and more preferably less than about 30 minutes. However, even during such transient periods, the reaction temperature should be less than about 400° C., preferably less than about 375° C. and more preferably less than about 350° C. Should the shift catalyst be subjected to over-temperature conditions for an extended period of time, the activity of the catalyst can irreversibly change to favor a methanation reaction.

The shift catalyst requires regeneration in order to maintain its activity. Regeneration of the shift catalyst can be achieved through oxidation. Specifically, the flow of steam to the reformer and to the shift catalyst bed is interrupted so that only air flows through the shift bed. After the reactor has been purged, oxidation of the shift catalyst bed is allowed to proceed. Regeneration of the catalyst bed through oxidation can be allowed to proceed more slowly at lower temperatures, e.g. by maintaining the shift bed at a temperature about 220° C. overnight, or may be driven more quickly at higher temperatures, e.g. by maintaining the shift bed at a temperature up to about 400° C. for about hour or more. During regeneration, care should be taken to ensure that neither liquid water nor steam flow through the shift catalyst bed.

Figure 4:
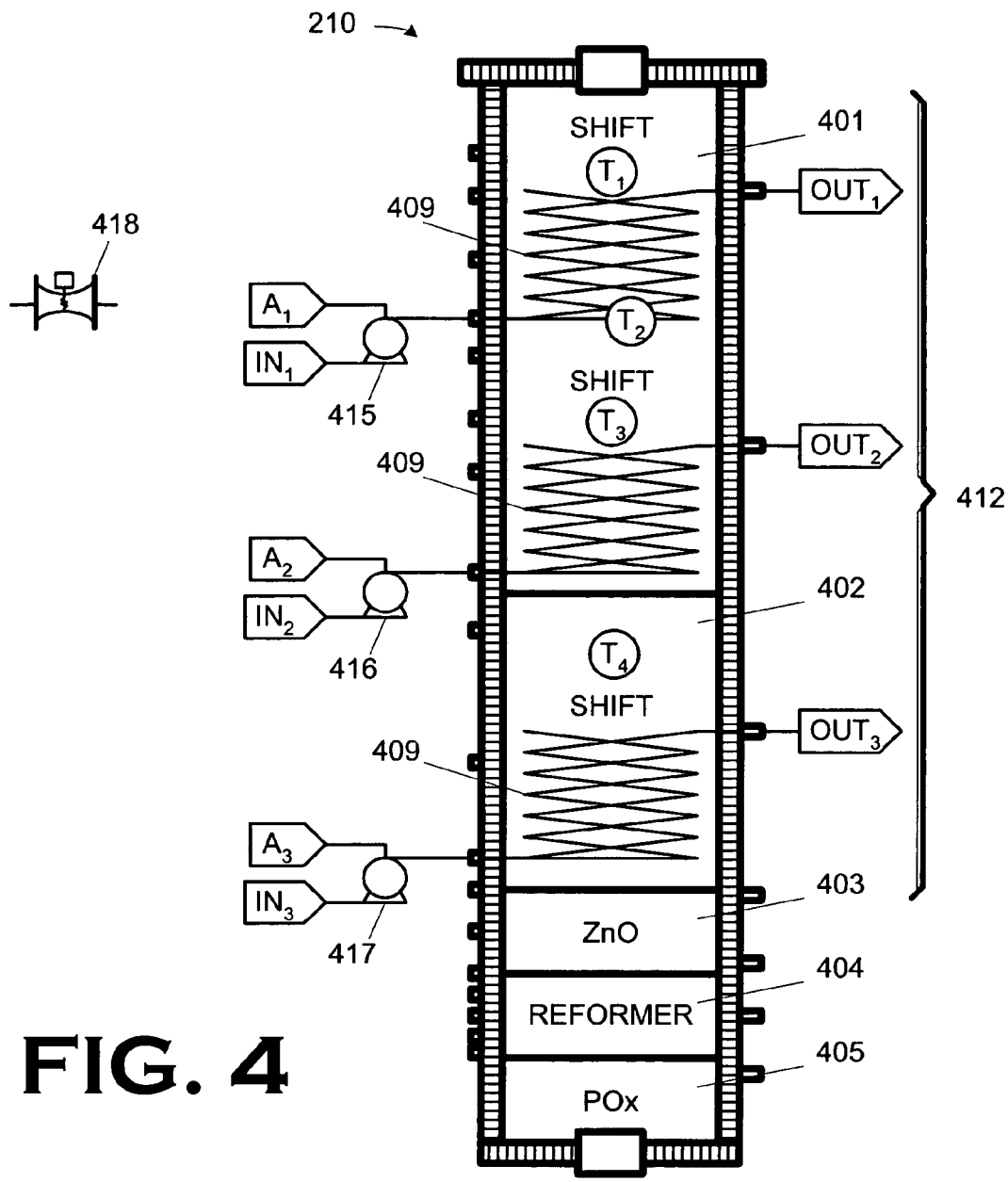
FIG. 4 details the reformer of the fuel processor in FIG. 2 and its operation.

FIG. 4 conceptually depicts one particular implementation of the ATR 210. The ATR 210 may be implemented with any suitable design known to the art. The ATR 210 comprises several stages 401-405, including several heat exchangers 409 and electric heaters (not shown). The reformer shift bed 412, i.e., the sections 401-402, is functioning to perform the water gas shift reaction, discussed above relative to FIG. 3, which reduces CO concentration and increases $H_2$ production rate.

Each of the heat exchangers 409 receives temperature controlled coolant (not shown) from the thermal subsystem 228, shown in FIG. 2, over the lines $IN_1$-$IN_3$, respectively, and returns it over the lines $OUT_1$-$OUT_3$, respectively. The flow rate for the coolant in each line is controlled by a respective variable speed (i.e., positive displacement) pump 415-417. The pumps 415-417 are controlled by the automated control system 106, shown in FIG. 1, by signals received over the lines $A_1$-$A_3$, respectively. In alternative embodiments, a single pump may supply coolant under pressure over the lines $IN_1$-$IN_3$ and the flow rate may be controlled by flow control valves such as the flow control valve 418. Those in the art having the benefit of this disclosure will appreciate that this figure is simplified by the omission of some elements not material to the practice of the invention in this particular embodiment. For example, the heat exchangers mentioned above and various inputs and outputs to the sections 403-405 have been omitted for the sake of clarity and so as not to obscure the present invention.

The shift bed 412 also includes a plurality of sensors $T_1$-$T_4$ disposed therein. The precise number of temperature sensors $T_x$ is not material to the practice of the invention, although a greater number will typically provide a finer degree of control. In the illustrated embodiment, the temperature sensors $T_1$-$T_4$ are thermocouples, but other types of temperature sensors may be used in alternative embodiments. The automated control system 106 uses the temperature sensors $T_1$-$T_4$ to monitor actual temperatures at various locations within the shift bed 412. Temperature detection points are selected based upon the structure of the cooling/heating system and should be selected so that the measured temperatures reflect true reaction temperatures rather than localized temperatures adjacent the heat exchange coils 409.

Note that the temperature sensors $T_1$ and $T_2$ both measure temperature near the same heat exchanger 409 in a detail that is implementation specific. That particular heat exchanger 409 includes only a single coolant input $IN_1$. Most of the temperature sensors $T_1$-$T_4$ measure temperature downstream from a catalyst bed section containing a heat exchanger 409. $T_1$ is supposed to read the temperature immediately downstream from the uppermost catalyst bed (not shown). However, during installation and shipping the bed can shift and settle so that $T_1$ is measuring an air temperature rather than a bed or reaction temperature. Thus, a second sensor $T_2$ is added to monitor the upper section 401 of the ATR 210. When $T_1$ and $T_2$ are sensing different temperatures, the control system 106 takes the higher of the two temperatures. Typically, there usually is only a minor difference between the two temperatures.

Preheating and water cooling maintain the temperature in the shift bed 412 within a desired reaction temperature range. In order to achieve this objective, in an enlarged shift reactor, multiple heat exchange coils 409 may provide localized temperature control. In the illustrated embodiment, the elongated shift bed 412 utilizes three different heat exchange coils 409 for controlling the temperature of the shift bed 412. The reaction temperature control strategy varies as a combination result of $H_2$ production rate, shift reaction stage, shift bed vertical temperature gradient and the temperature detecting points in a manner described more fully below. A robust shift temperature control loop is developed for the reformer to generate stable and high quality $H_2$ product.

Figure 5:
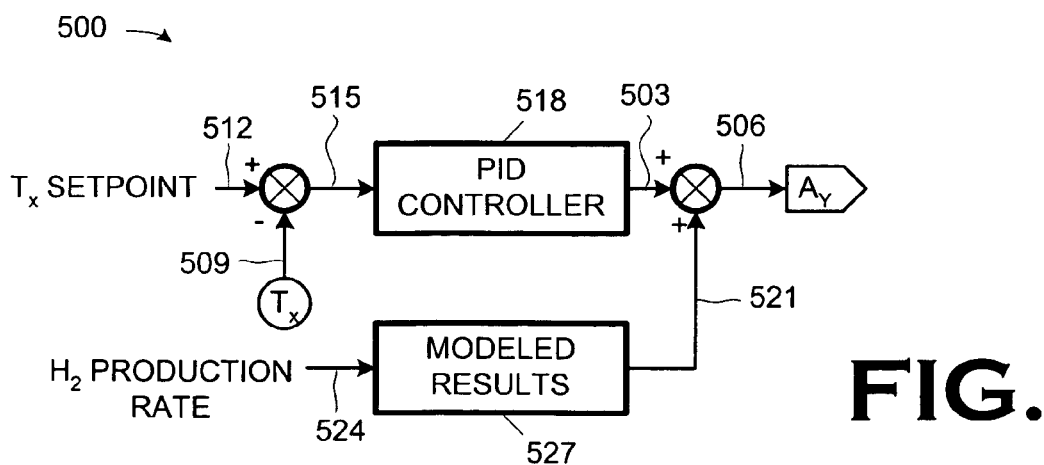
FIG. 5 depicts the automated control system of the reformer of FIG. 4 in accordance with one aspect of the present invention.

FIG. 5 conceptually illustrates a control loop 500 employed by the illustrated embodiment in accordance with the present invention. The settings for each of the variable speed pumps 415-417 is controlled by a respective control loop 500. The control technique of the present invention employs, in the illustrated embodiment, the complete system modeling effect (the reformer as a whole, including ATR section, ZnO section, shift section, production rate, etc.), develops a dynamic PID control loop to the plant response, and testing data are used to compensate the model offset to improve the robustness of the controller.

More particularly, system modeling takes into account the target hydrogen production rate based upon current flow rates, upstream temperature profiles, reaction stage and shift bed temperature gradient due to heat loss and exothermal reaction effect. A system model for each section of the shift bed can be generated from reactions and conditions upstream, the geometries of the reactor(s), the feed to that section of the bed, and the shift catalyst(s) used etc. Various modeling techniques of this type are known to the art, and any suitable modeling technique may be employed. The system modeling is used to generate set points to be used for the temperature control. These set points include the predicted reformate composition, flow rate and temperature that will be entering a particular shift bed section. Thus, the system modeling generates a group of setpoints for the temperatures measured by the temperature sensors $T_1$-$T_4$. The system modeling also produces a set of results correlating, for example, the temperatures that may be measured by the temperature sensors $T_1$-$T_4$ and the $H_2$ production rate of the ATR 210.

More particularly, the model (not shown) used by the illustrated embodiment was developed using Aspen Plus and Aspen Custom Modeler. These software packages are commercially available from:

> Aspen Technology, Inc. Ten Canal Park Cambridge, Mass. 02141-2201USA Phone: +1-617-949-1000Fax: +1-617-949-1030email: info@aspentech.com However, other suitable modeling software known to the art may be employed in alternative embodiments.

The model has both steady-state and dynamic capabilities. The performance of the fuel processor 102 is estimated by the model from thermodynamic parameters that result in a desired state at the given temperature and pressure. Reaction conversions and compositions are determined from either kinetic data available in literature for such typical reactions or estimated from models based on experiments conducted in the laboratory for specific reactions. The desired $H_2$ purity and flow rate for the reformate 110 are specified and the model calculates natural gas flow, air flow (calculated back from the optimum $O_2$/C ratio), and water flow (calculated back from the optimum Steam/Carbon ratio).

The resulting temperature of the ATR 210 is calculated as the adiabatic temperature rise resulting from minimizing the free energy of the ATR reaction. The composition of reformats is determined by the model (from thermodynamic and reaction parameter estimations). Using this composition, the model then calculates the desired speed needed for the end use from empirical correlations.

Figure 6:
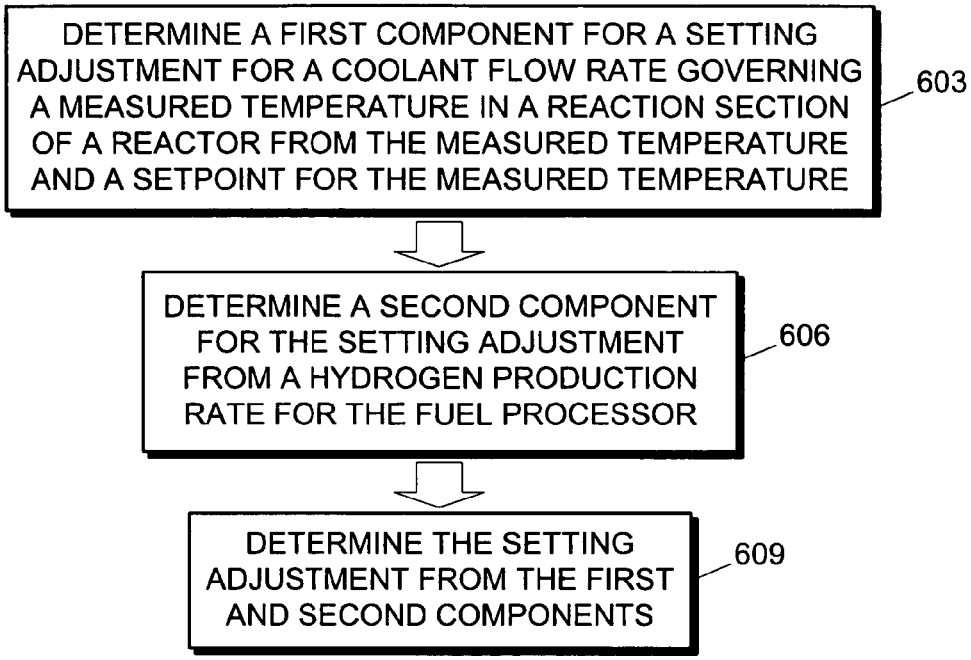
FIG. 6 illustrates one particular embodiment of a method practiced in accordance with another aspect of the present invention.

FIG. 6 illustrates one particular embodiment of a method 600 practiced in accordance with another aspect of the present invention. More particularly, the method 600 is a method for use in controlling the reaction temperature of a fuel processor, i.e., the temperature in the shift bed 412, shown in FIG. 4, of the ATR 210, first shown in FIG. 2, of the fuel processor 102, first shown in FIG. 1. The method 600 is for the control of a temperature in a single location, e.g., the temperature measured by the temperature sensor $T_1$. However, the method 600 can be applied in serial or in parallel to control the temperature in a plurality of locations throughout the shift bed 412 or elsewhere in the ATR 210. Application of the method 600 will be illustrated in the context of the control loop 500, shown in FIG. 5. However, alternative embodiments may implement the method 600 using control loops of alternative design.

The method 600 begins by determining (at 603) a first component 503 for a setting adjustment 506 for an actuator governing a measured temperature 509 in a reaction section of a reactor from the measured temperature 509 and a setpoint 512 for the measured temperature. The setpoint 512 is determined as a part of the modeled results discussed above. The measured temperature 509 is the temperature measured by the temperature sensor $T_x$ at the point of interest in the shift bed 412, shown in FIG. 4, at which the temperature sensor $T_x$ is disposed. In the illustrated embodiment, the difference 515 between the setpoint 512 and the measured temperature 509 is input to a proportional-integral-derivative ("PID") controller 518, such as is known in the art. The output of the PID controller 518 is the first component 503.

The method 600 also determines (at 606) a second component 521 for the setting adjustment 506 from a $H_2$ production rate 524 for the fuel processor 102. In the illustrated embodiment, at least selected portions of the modeled results previously discussed are tabulated in a form indexable by the $H_2$ production rate. Thus, the modeled results 527 may be, for instance, a look-up table wherein various setting adjustments for the actuator are indexed by the $H_2$ production rate to which they correlate. Note that the modeled results 527 are typically generate a priori by modeling the operation of the fuel processor 102 in a variety of operating scenarios to obtain this information. Note also that the determination of the first and second components 503, 521 may be performed in parallel or in serial.

The method 600 then determines (at 609) the setting adjustment 506 from the first and second components 503, 521. In the illustrated embodiment, the first and second components 503, 521 are summed to obtain the setting adjustment 506, although alternative embodiments may use more sophisticated techniques for the determination. The setting adjustment 506 is then signaled to the actuator over the line $A_y$. Note that the setting adjustment 506 may be 0, i.e., no change is needed because the measured temperature 509 suitable matches the setpoint 512. However, at any given time, at least one of, and sometimes all of, the first component 503, the second component 521, and the setting adjustment 506 will be non-zero.

Note that, in some circumstances, the first and second components 503, 521 could work in opposite directions with one telling a pump to increase flow and the other telling the pump to decrease flow. Thus, in the illustrated embodiment, the two components 503, 521 are not given equal weight in controlling the coolant flow. Specifically, the $H_2$ production rate and the information from the look up table, i.e., the second component 521, is the dominant component. The first component 503 that is derived from sensed temperatures 509 and the setpoints 512, is used to fine tune the pump speed. By way of example, the second component 521 might instruct a given pump to operate at 50% of capacity, while the first component focuses on the error and may adjust the pump speed by ±5% of capacity.

The method 600, shown in FIG. 6, and the control 500, shown in FIG. 5, are implemented as parts of the automated control system 106 in software in the form of a control application residing on the computing device 108, both shown in FIG. 1. The automated control system 106, as a whole, is largely implemented in software on a computing apparatus, such as the rack-mounted computing apparatus 700 illustrated in FIG. 7A and FIG. 7B. Note that the computing apparatus 700 need not be rack-mounted in all embodiments. Indeed, this aspect of any given implementation is not material to the practice of the invention. The computing apparatus 700 may be implemented as a desktop personal computer, a workstation, a notebook or laptop computer, an embedded processor, or the like.

Figure 7A:
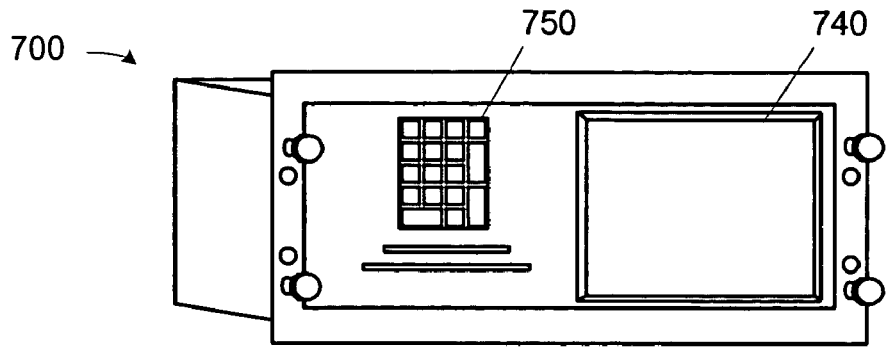
FIG. 7A and FIG. 7B conceptually illustrate a computing apparatus as may be used in the implementation of one particular embodiment of the present invention.
Figure 7B:
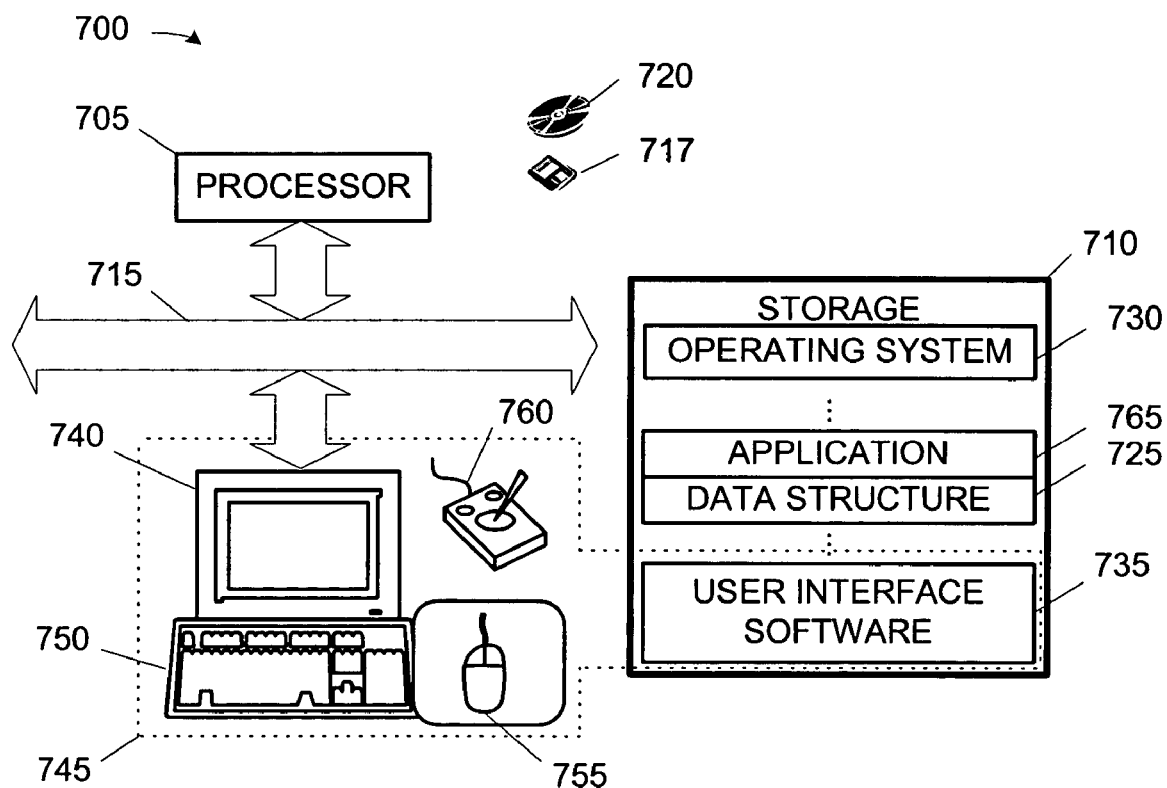

The computing apparatus 700 illustrated in FIG. 7A and FIG. 7B includes a processor 705 communicating with storage 710 over a bus system 715. The storage 710 may include a hard disk and/or random access memory ("RAM") and/or removable storage such as a floppy magnetic disk 717 and an optical disk 720. The storage 710 is encoded with a data structure 725 storing the data set acquired as discussed above, an operating system 730, user interface software 735, and an application 765. The user interface software 735, in conjunction with a display 740, implements a user interface 745. The user interface 745 may include peripheral I/O devices such as a key pad or keyboard 750, a mouse 755, or a joystick 760. The processor 705 runs under the control of the operating system 730, which may be practically any operating system known to the art. The application 765 is invoked by the operating system 730 upon power up, reset, or both, depending on the implementation of the operating system 730. In the illustrated embodiment, the application 765 includes the control system 106 illustrated in FIG. 1.

Thus, at least some aspects of the present invention will typically be implemented as software on an appropriately programmed computing device, e.g., the computing apparatus 700 in FIG. 7A and FIG. 7B. The instructions may be encoded on, for example, the storage 710, the floppy disk 717, and/or the optical disk 720. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein may consequently be presented in terms of a software-implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Thus, returning to FIG. 4, the ATR 210 includes a plurality of temperature sensors $T_1$-$T_4$ disposed within the shift bed 412 at points of particular interest. The control application 765 residing in the storage 710 of the computing apparatus 700, shown in FIG. 7A-FIG. 7B, includes a control loop 500, shown in FIG. 5, for each of the sensors $T_1$-$T_4$. The data structure 725 includes the modeled results comprising at least the setpoints 512 for the sensors $T_1$-$T_4$ and the second components 521 and their correlated $H_2$ production rates 524.

Figure 8:
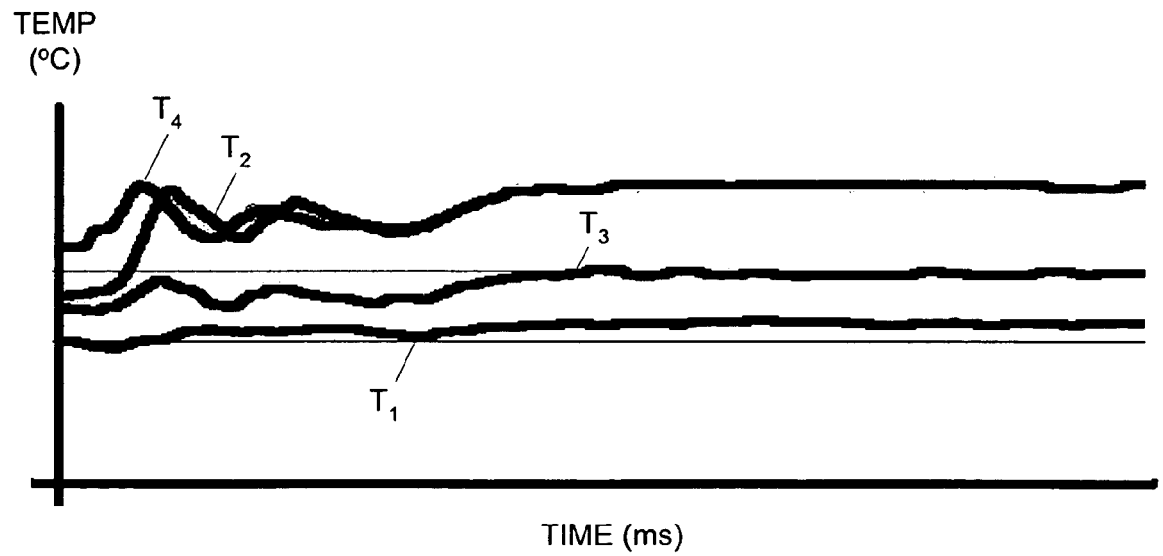
FIG. 8 graphs temperature over time for four different locations in the reactor of the fuel processor as shown in FIG. 4.

The shift reaction temperature in the shift bed 412, shown in FIG. 4, is usually a constant number at a certain given reaction stage. The system model (not shown) generates an amount of coolant needed for each section 401, 402 of the shift bed 412 based upon the current reformer feeding rate and what is occurring upstream from that section of the shift bed 412. The control loops 500 use these numbers as the targeting set points 512. The temperature sensors $T_1$-$T_4$, positioned in different locations of the shift bed 412, provide feedback of the reaction temperature during steady-state operations, to the control loops 500. The reaction temperature feedback forms a closed loop control on the desired temperatures, i.e., the setpoints 512. The dynamic PID controllers 518 in the control loops 500 automatically adjust the plant response time according to the dynamic change of the shift bed temperatures feedback. As shown in FIG. 8, the controller produces stable reaction temperatures across each section of the bed and could be programmed to provide a uniform temperature across the bed.

Figure 9:
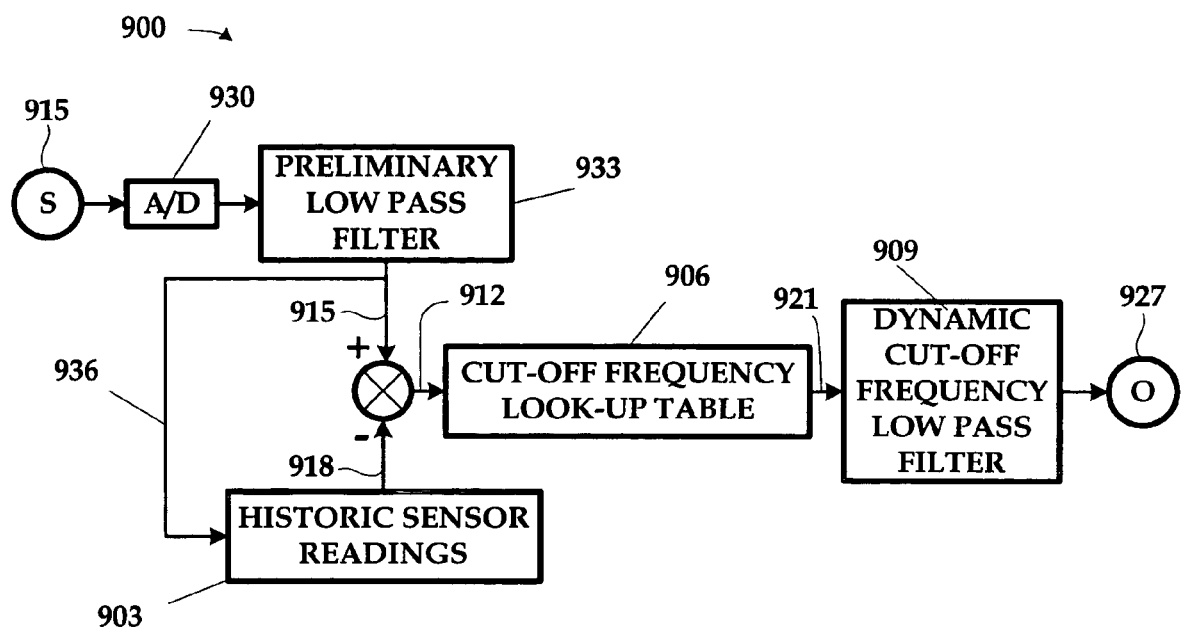
FIG. 9-FIG. 10 illustrate a filtering technique employed in some embodiments of the present invention for filtering signals output by sensors in the apparatus of FIG. 1.
Figure 10:
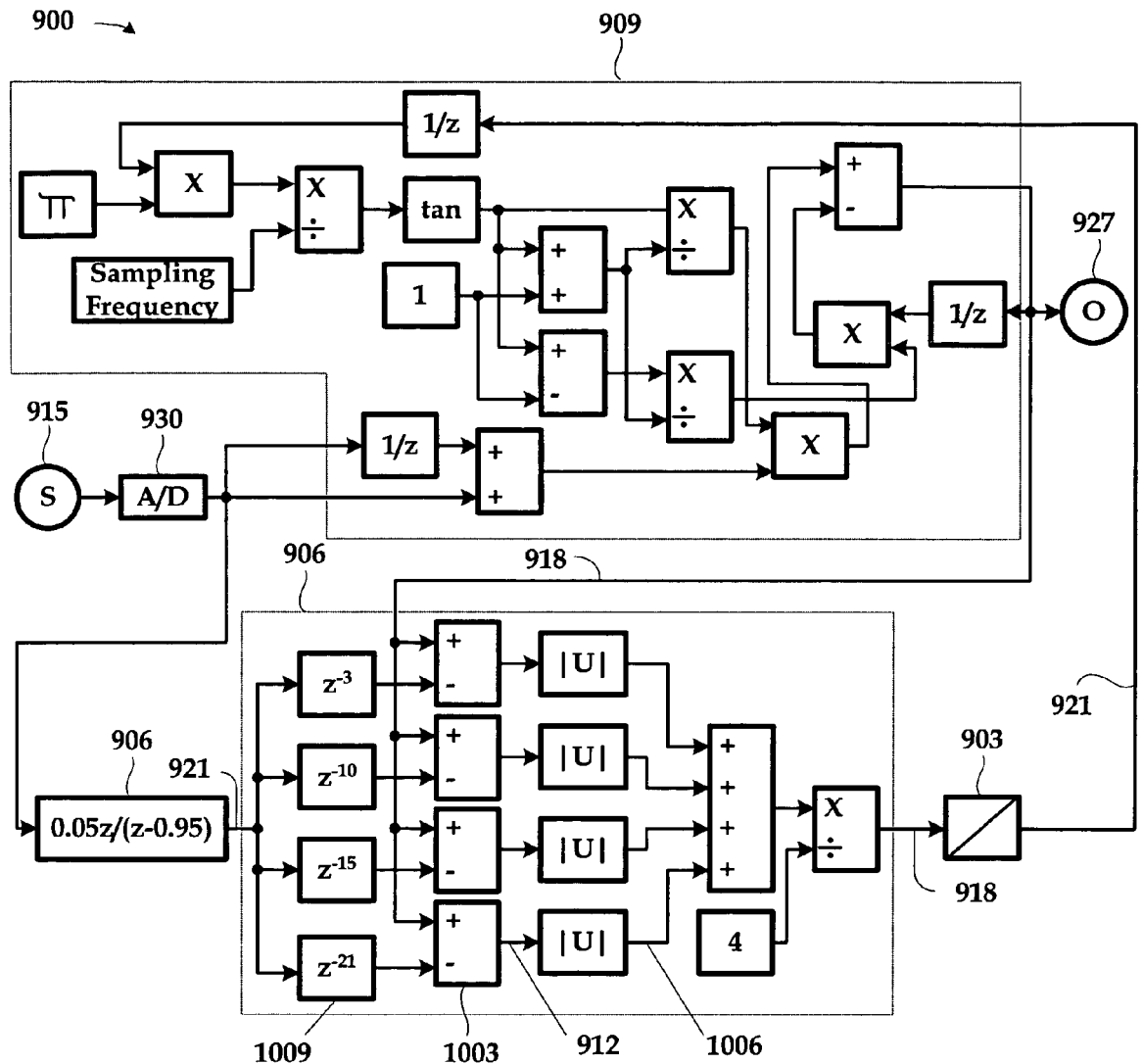

FIG. 9 is a block diagram of a filtering technique in accordance with the present invention used to filter the temperature measurements 1009, shown in FIG. 10. As is shown in FIG. 9, the filter 900 comprises a store 903 of at least one historical sensor measurement; a store 906 of potential cut-off frequencies, and a filter 909 having a dynamic cut-off frequency. The filter 909 may be a low pass filter, a high pass filter, or a band pass filter, depending on the implementation. Each potential cut-off frequency in the store 906 is associated with a respective potential difference 912 between a sensor measurement 915 and the stored historical sensor measurement 918. The filter 909 has a cut-off frequency 921 dynamically selected from the stored potential cut-off frequencies 906 on the basis of a difference 912 between the stored historical sensor measurement 918 and the current sensor measurement 915. In operation, the filter 900 first determines a difference 912 between a current sensor measurement 915 and a historical sensor measurement 918. The filter 900 then dynamically selects a cut-off frequency 921 for a filter 909 for the current sensor measurement 915 from the difference 912 to obtain a filtered output 927.

More particularly, the current sensor measurement 915 is sampled into the data acquisition system every 100 milliseconds and converted to a digital format by the analog-to-digital ("A/D") converter 930. A preliminary low-pass filter 933 with a fast response characteristic preliminarily filters the current sensor measurement 915. The preliminary low-pass filter 933 employs a constant cut-off frequency to preliminarily filter certain frequencies that will be known to be noise in the particular implementation. The preliminary low-pass filter 933 is optional from the standpoint of the invention since, in some embodiments, the sensors (not shown) through which the measurements are taken may be of sufficient quality that they produce minimally low levels of noise. Similarly, the context in which the invention is employed may be such that environmental factors might not introduce significant levels of noise. However, in general, a preliminary low-pass filter 933 will be desirable in most applications.

A few historic sampling points in the store 903 are compared with the current sensor measurement 915 to determine the rate of change of this particular process variable represented by the current sensor measurement 915. More particularly, as will be discussed further below, the historical sensor measurement 918 is actually an average of four past sensor measurements 915. Each filtered sample of the sensor measurement 915, is returned to the historical sensor measurement store 903 through a feedback 936 to populate the store 903. The cut-off frequency store 906 containing the rate of changes versus cut-off frequencies is used to set the cut-off frequency 921 of the low pass filter 909.

In this particular embodiment, the decision making process of the cut-off frequency is updated during each sampling period to avoid filtering out the true sensor signal. More particularly, as those in the art having the benefit of this disclosure will appreciate, the filtering technique is applied over time through multiple iterations as the current sensor measurement 915 is sampled. In each iteration, the historical sensor measurement 918 is an average of four past sensor measurement 915. Periodically, a sensor measurement 915 for the current iteration is transmitted to the store to take the place of the sensor measurement 915, which is then purged. In this way, when the process parameter represented by the current sensor measurement 915 is in a steady state, high frequency signals, which are apparently the noises, are filtered out. When the process parameter is in a dynamic change state, the cut-off frequency 921 is shifted up to avoid filtering out the true signal.

Note that, in the embodiment of FIG. 9, the cut-off frequency 921 is a piecewise linear function of the difference 912. In the illustrated embodiment, if the difference (d) is $3\% \leq d \leq 10\%$ (full scale), then the cutoff frequency is set to 0.01-0.2 (normalized, Z-domain). In such an embodiment, the precise parameters of the relationship will be a function of implementation specific considerations, such as the type of process being monitored and how rapidly it is expected to change. In the illustrated embodiment, which the monitored process is a water-gas shift reaction in an autothermal reformer, which is not expected to change rapidly during normal or steady state operations. Some alternative embodiments might even choose to use some other type of relationship.

FIG. 10 illustrates the functional components of the filter 900 in FIG. 9. More particularly, FIG. 10 illustrates in a block diagram the transfer function 1000 of the $1^{st}$ order filter 900 in FIG. 9 in the z-domain. Note that, in this embodiment, there are four flip-flops 1003. Each stores the difference between a respective historical sensor measurements 918 (only one indicated) and the current sensor measurement 915. The absolute values 1006 (only one indicated) of the differences 912 (only one indicated) are then averaged and the averaged historical sensor measurement 918 is used to obtain the cut-off frequency 921 from the cut-off frequency look-up table 906.

Note also that the delays 1009 (only one indicated) for the flip-flops 1003 differ, and that, collectively, they store the four historical sensor measurements 918.

Still referring to FIG. 10, because the filter 900 is taking readings so fast, the historical sensor measurements 915 in the store 903 should not be too close to the current sensor measurement 915. The delays 1009 are shown in the form of $Z^{-x}$, where x is the number of readings preceding the current reading. Thus, $Z^{-3}$ indicates the third sensor measurement 915 preceding the current sensor measurement 915, $Z^{-10}$ indicates the tenth sensor measurement 915 preceding the current sensor measurement 915, etc. The value of x is arbitrary but should be large enough so that the historical sensor measurement 915 is not too close to the current sensor measurement 915.

Returning to FIG. 1, in operation, the apparatus 100 must first be initialized, or started-up. In general terms, the fuel processor 102 start-up involves lighting off oxidizer 214, bringing the oxidizer 214 to operating conditions lighting off the ATR 210 and then bringing the ATR 210 to operating conditions. The oxidizer 214 light off is the state of the oxidizer 214 when there is an ongoing catalyzed reaction between the fuel and air in a desired temperature range. Similarly, the ATR 210 light off is the state of the ATR 210 when it is considered to have an ongoing catalyzed reaction between the components of the process feed stream 220 received from the oxidizer 214. The start-up procedure will largely be implementation specific, depending on the design of the ATR 210 and the oxidizer 214 and their inter-relationship.

Once the fuel processor 102 is started-up, it goes into its operational cycle. The operational cycle comprises steady-state operations for the process flow 300, discussed above relative to FIG. 3. It is during the operational cycle that the method 600, shown in FIG. 6, is implemented by the automated control system 106. The temperature sensors $T_1$-$T_4$ continuously sense their respective temperatures, but the control loop 500, shown in FIG. 5, is only implemented during the operational cycle. The method 600 is performed for each of the temperatures measured by the temperature sensors $T_1$-$T_4$ in parallel. The method 600 may be performed continuously or at periodic intervals, depending on the implementation.

Eventually, the operational cycle ends, and the fuel processor 102 is shutdown. The shutdown may be planned, as in the case for maintenance, or unplanned, as when a shutdown error condition occurs. Either way, a part of the shutdown is the termination of method 600, shown in FIG. 6. The oxidizer 214 and ATR 210, respectively, are, in general terms, purged and cooled. On transition to the shutdown state, the air subsystem 226, the water subsystem 224, and the thermal subsystem 228 are providing air 218, water 216, and thermal control to the oxidizer 214 and the ATR 210. As with the start-up, the shutdown procedure will largely be implementation specific, depending on the design of the ATR 210 and the oxidizer 214 and their inter-relationship. In the illustrated embodiment, the ATR 210 is first purged and shutdown, followed by the oxidizer 214 purge and shutdown.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
    a fuel processor reactor, the reactor including a water gas shift reaction section;
    a temperature sensor disposed within the reaction section;
    a coolant flow line through the reaction section;
    an automated control system capable of:
        determining a first component for a setting adjustment for a coolant flow rate through the coolant flow line from the measured temperature and a setpoint for the measured temperature wherein, in determining the first component, the automated control system is capable of:
            determining the difference between the setpoint and the measured temperature; and applying the difference to a proportional-integral-derivative controller to determine the first component from the difference;
        determining a second component for the setting adjustment from a hydrogen production rate for the fuel processor wherein, in determining the second component, the automated control system is capable of: modeling the operation of the fuel processor in a plurality of operational scenarios; tabulating the model results in a manner indexable by the hydrogen production rate; and retrieving the second component from the tabulated results; and
        determining the setting adjustment from both the first component and the second component.

2. The apparatus of claim 1; wherein the automated control system accords both the first component and the second component different weights in determining the setting adjustment.

3. The apparatus of claim 1, wherein, in determining a first component for a setting adjustment for a coolant flow rate, the automated control system is capable of one of determining a setting adjustment for a pump and determining a setting adjustment for a flow control valve.

4. The apparatus of claim 1, wherein the reactor comprises an auto-thermal reactor.

5. The apparatus of claim 1, wherein the temperature sensor comprises a thermocouple.

6. The apparatus of claim 1, wherein the coolant flow rate through the coolant flow line is governed by one of a pump and a flow control valve.

7. An apparatus, comprising:
    a fuel processor reactor, the reactor including a water gas shift reaction section;
    means for sensing a temperature within the reaction section;
    means for passing a coolant through the reaction section;
    means for controlling the temperature in the reaction section, including:
        means for determining a first component for a setting adjustment for a coolant flow rate through the coolant flow means from the measured temperature and a setpoint for the measured temperature wherein, the means for determining the first component includes: means for determining the difference between the setpoint and the measured temperature; and means for applying the difference to a proportional-integral-derivative controller to determine the first component from the difference;

means for determining a second component for the setting adjustment from a hydrogen production rate for the fuel processor wherein, in determining the second component, the automated control system is capable of: means for modeling the operation of the fuel processor in a plurality of operational scenarios; means for tabulating the model results in a manner indexable by the hydrogen production rate; and means for retrieving the second component from the tabulated results; and means for determining the selling adjustment from both the first component and the second component.

8. The apparatus of claim 7, wherein the controlling means accords both the first component and the second component different weights in determining the setting adjustment.

9. The apparatus of claim 7, wherein the means for determining a first component for a setting adjustment for a coolant flow rate includes one of means for determining a setting adjustment for a pump and means for determining a selling adjustment for a flow control valve.

10. The apparatus of claim 7, wherein the reactor comprises an auto-thermal reactor.

11. The apparatus of claim 7, wherein the temperature sensing means comprises a thermocouple.

12. The apparatus of claim 7, wherein the coolant flow rate through the coolant flow means is governed by one of a pump and a flow control valve.

13. An apparatus, comprising:
a processor;
a bus system;
a storage communicating with the processor over the bus system;
a data structure residing on the storage, the data structure including the modeled data for the performance of a fuel processor;
a control application residing in the storage that, when invoked by the processor, is capable of determining a setting adjustment for a coolant flow rate governing a measured temperature in a reactor of a fuel processor, the determination predicated on the measured temperature, a setpoint for the measured temperature, a hydrogen production rate for the fuel processor, and the modeled data.

14. The apparatus of claim 13, wherein, in determining the first component, the control application is capable of:
determining the difference between the setpoint and the measured temperature; and
applying the difference to a proportional-integral-derivative controller to determine the first component from the difference.

15. The apparatus of claim 13, wherein, in determining the second component, the control application is capable of:
modeling the operation of the fuel processor in a plurality of operational scenarios;
tabulating the model results in a manner indexable by the hydrogen production rate; and
retrieving the second component from the tabulated results.

16. The apparatus of claim 13, wherein the control application accords both the first component and the second component different weights in determining the setting adjustment.

17. The apparatus of claim 13, wherein, in determining a first component for a selling adjustment for a coolant flow rate, the control application is capable of one of determining a setting adjustment for a pump and determining a setting adjustment for a flow control valve.

* * * * *